United States Patent [19]

Rosenau

[11] 4,017,050

[45] Apr. 12, 1977

[54] FISHING ROD HOLDER APPARATUS

[76] Inventor: Gordon G. Rosenau, 400-7th Ave. NW., Waseca, Minn. 56093

[22] Filed: Aug. 7, 1975

[21] Appl. No.: 602,584

[52] U.S. Cl. .............................. 248/534; 248/223.4
[51] Int. Cl.² ........................................ A01K 97/10
[58] Field of Search ............... 248/38, 40, 42, 223, 248/224, 225, 226 R, 220.5, 204, 534, 535, 540, 541, 538; 24/230 CF, 230 BC, 230 SL, 223, 224 PL, 224 LS

[56] References Cited

UNITED STATES PATENTS

| 846,022 | 3/1907 | Ficener | 248/224 |
|---|---|---|---|
| 1,760,592 | 5/1930 | Gift | 248/42 |
| 2,519,851 | 8/1950 | Reynolds | 248/38 |
| 2,610,014 | 9/1952 | Ananson | 248/226 A |
| 2,680,000 | 6/1954 | Pulver | 248/225 |
| 2,893,667 | 7/1959 | Shumaker | 248/40 |
| 3,061,250 | 10/1962 | Conover | 248/224 |
| 3,140,069 | 7/1964 | McBurney et al. | 248/40 |

FOREIGN PATENTS OR APPLICATIONS 537,726  10/1955  Belgium ............................ 248/225

*Primary Examiner*—Robert A. Hafer
*Attorney, Agent, or Firm*—Dugger, Johnson & Westman

[57] ABSTRACT

A fishing rod holder that includes a fishing rod mount which in cooperation with a bracket mounted on a boat removably mounts a fishing rod on a boat to extend in overhanging relationship to a body of water in a position to catch fish. The bracket is generally U-shape and has a mount receiving slot that opens through one leg and the web thereof. The mount has a spring biased latch mounted in a latch chamber for latchingly engaging a slotted position of the bracket, and opposite side portions that each have vertically spaced flanges that in part define a transversely elongated groove for slidably receiving a bracket portion that in part defines the bracket slot.

5 Claims, 7 Drawing Figures

FISHING ROD HOLDER APPARATUS

BACKGROUND OF THE INVENTION

A fishing rod holder mountable on a boat.

While fishing at times it is desired to be able to leave a fishing rod with the line in the water and at the same time be assured that the rod will not be lost even though the rod is left unattended. Also, at times it is desirable to be able to attachably secure a fishing rod to a boat, and at the same time permit the fishing rod being easily disattached from the boat.

In order to accomplish the above, as well as overcome various other problems in removably securing a fishing rod to a boat, this invention has been made.

SUMMARY OF THE INVENTION

Fishing apparatus that includes a bracket that is mountable on a boat and has a foot receiving slot and a fish rod mount that has a foot portion extendable into the slot and manually operated locking mechanism for releasably securing the mount to the bracket when the foot portion extends into the slot.

One of the objects of this invention is to provide new and novel fishing rod holder means that is mountable on a boat. Another object of this invention is to provide a fishing rod mount that has new and novel means for latchingly engaging a bracket on a boat to permit the mount being easily attached to and disattached from the boat. In furtherance of the last mentioned object, it is another object of this invention to provide a new and novel fishing rod holder that may be used with fishing rods that are of varying diameters at the location of the attachment of the holder to the rod. Still another object of this invention is to provide a new and novel fishing rod mount for clampingly engaging a fishing rod and that is readily removably latchingly engagable with a bracket mounted on a boat.

Figure 1:
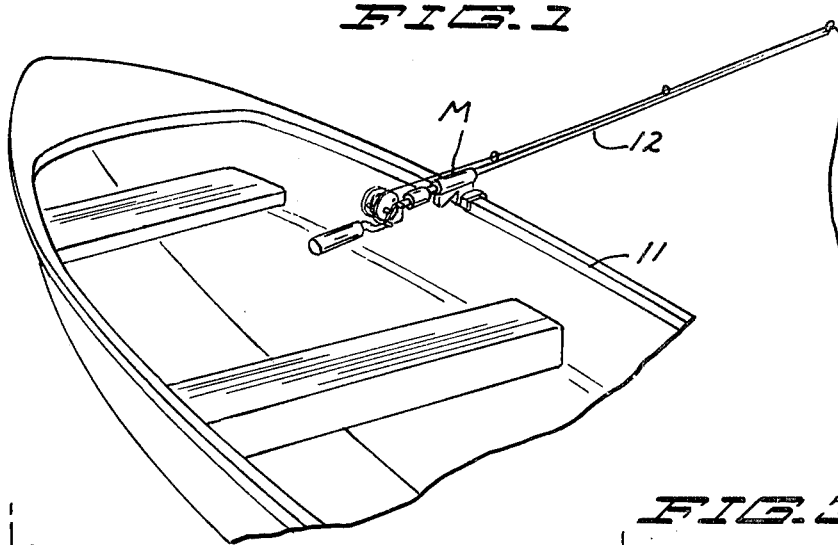
FIG. 1 is a perspective view showing the fishing rod holder apparatus of this invention mounting a fishing rod on a boat.

The fishing rod holder apparatus of this invention, generally designated 10, is utilized for supportingly holding a fishing rod 12 on a part of a boat, for example an upper wall portion 11, so that the hand grip portion of the fishing rod is located within the boat and at least most of the remainder of the rod extends outwardly of the boat. The apparatus 10 includes a bracket B having a web 15 and depending legs 13 and 14 that are dependingly joined to the web and spaced to have one extend on either side of the wall portion 11. The web includes a generally rectangular slot portion 16A that opens directly to a rectangular slot portion 16B in the leg 14, slots 16A, 16B providing a slot for receiving the foot portion of the fishing rod mount M. Advantageously, the web wall portion defining the edge of the slot opposite wall 14 is substantially spaced from the wall 13 while the width dimension W of the slot portion 16A is substantially smaller than the corresponding dimension X of the slot 16B and is centrally located relative thereto. Advantageously, a pair of spacers 17 may be joined to the bracket or integrally formed therewith to extend beneath the web portion and between the legs 13 and 14 with one located on either side of the slot 16A, 16B. Suitable fasteners, for example screws 19, are extended through the web and threaded into the wall portion 11 for securing the bracket B to said wall portion.

The fishing rod mount M includes two longitudinally elongated sections 21, 22 that are removably securable together by conventional fasteners, for example nuts and bolts 40. Advantageously, each of the sections 21, 22 may be of the same construction other than one is a left hand section and the other is a right hand section. The sections 21, 22 include semi-cylindrical elongated recesses 23, 24 respectively that extend the longitudinal length of the upper portion of each section; and when the sections are clamped together form a cylindrical recess for having the fishing rod extended therethrough. In view of the possible variations of the diameters of the fishing rods being mounted by the holders, advantageously a roll of plastic tape or film is provided and wound on the fishing rod at 25 to provide a clamping fit between the fishing rod and the walls defining the fishing rod chamber. In place of tape 25, suitable shims can be used.

The lower part of each of these sections, which extends below the rod receiving chamber, cooperatively provide the foot portion of the mount, and include a pair of vertically spaced, longitudinally elongated, transverse outer parallel flanges 28 and 29. the flanges 28, 29 in part define a longitudinally elongated groove 27. The longitudinal length F of the groove and flanges is advantageously slightly less than the dimension Y of the slot portion 16A.

The lower portions of each of the sections 21, 22 is provided with a longitudinally elongated recess 31, the recesses 31 in combination providing a latch chamber that opens both downwardly and rearwardly through the foot portion. The top wall 31A that in part defines the latch chamber is substantially vertically spaced from and beneath the fishing rod chamber. The upper, forward wall portion 31B that in part defines the latch chamber is located transversely between and forwardly of the rear terminal edges of the flanges 28, 29 that are on opposite sides, there being provided a ledge 32 that is located vertically below wall portion 31B and extends a short distance rearwardly thereof.

Figure 2:
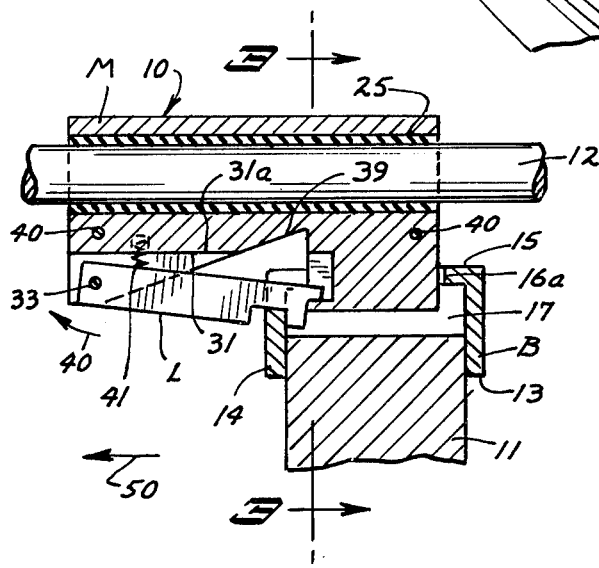
FIG. 2 is a longitudinal cross-sectional view showing the apparatus of this invention mounting a fishing rod on a boat, said view being generally taken along the line and in the direction of the arrows 2—2 of FIG. 3 and showing only a portion of a boat and a fishing rod.
Figure 3:
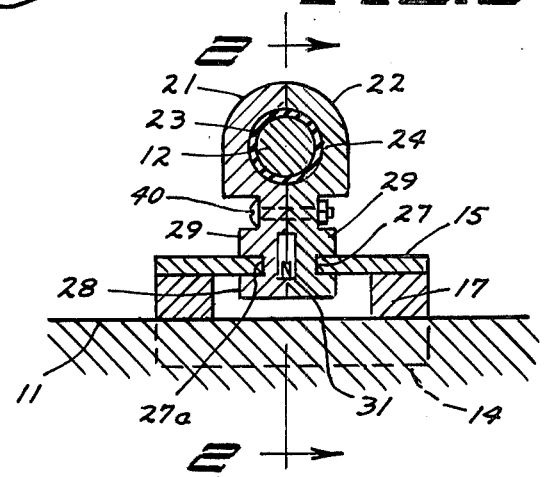
FIG. 3 is a transverse cross-sectional view of the fishing rod holder apparatus of this invention, said view being generally taken along the line and in the direction of the arrows 3—3 of FIG. 2.
Figure 4:
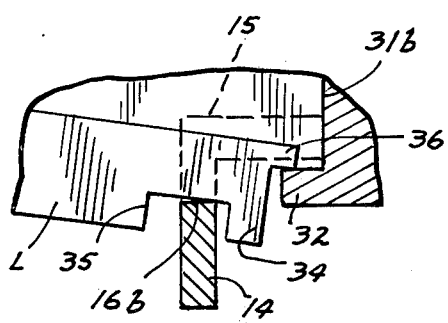
FIG. 4 is an enlarged fragmentary view illustrating the latch in the latching position and adjacent parts of the mounting bracket and fishing rod mount.
Figure 5:
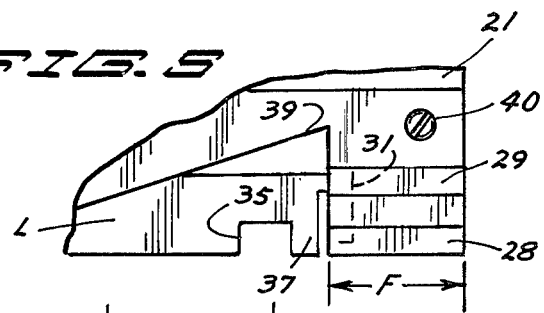
FIG. 5 is a fragmentary side elevational view showing the latch in an unlatching position and adjacent parts of the fishing rod mount.
Figure 7:
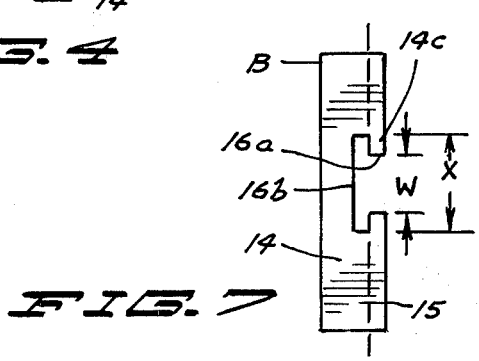
FIG. 7 is a side view of the mounting bracket.
Figure 6:
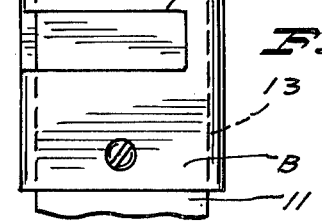
FIG. 6 is a plan view of the bracket mounted on a boat.

An elongated latch L extends in the recess 31 and has its rear end portion pivotally connected to the sections 21, 22 by a pivot member 33. A generally rectangular cutout 34 is provided in the front lower portion of the latch to form a forwardly extending lug 36 that is abuttable against the upper surface of the ledge 32 to limit the pivotal movement of the latch in the direction of the arrow 40 to its latching position of FIGS. 2 and 4. A coil spring 41 has one end portion seated in an appropriate well that is formed in one or both of the sections and opens to the latch chamber, the opposite end of the spring abutting against the latch for resiliently urging the latch to pivot in the direction of the arrow 40. Rearwardly of the cutout 34, the latch is provided with a downwardly opening cutout 35, the cutouts 34 and 35 providing a downwardly extending lug 37. The cutout 35 is of a size to have the wall portion defining the lower edge of slot portion 16B extended thereinto when the latch is in a latching position. The foot portion is provided with a cutout 39 that extends transversely thereacross longitudinally between the front and rear of the latch chamber and opening thereto to facilitate manually moving the latch from its latching position to its release position, even when the latch latchingly engages bracket wall portion 14.

In using the apparatus of this invention, the parts of the fishing rod mount are assembled to clampingly hold the fishing rod in the fishing chamber, advantageously at a location that is forwardly of and adjacent to the reel (assuming the fishing rod is a rod and reel combination), and the bracket is mounted on a boat in a manner that has been previously indicated. In this connection it is to be noted that when the bracket is mounted on the boat, the leg 14 is located on the inward side of the boat and the leg 13 is adjacent the exterior surface of the boat; or else the bracket could be mounted on the top of the side wall of the boat. The spacers 17 serve to maintain the web portion of the bracket sufficiently vertically above the top edge of wall portion 11 that the bottom edge of the slot portion 16B is above said top edge portion. Now the user's finger is extended into cutout 39 for pivoting the latch in the direction opposite the arrow 40 to a position that the lower edge of lug 37 is at a higher elevation than the bottom surface of the sections 21, 22. Thence, the mount M is moved such that the front end of the lugs 28 extend into the slot portion 16B while the parts 14C of the web defining the side edges of the slotted portion 16A extend into the grooves 27. Now the mount is pushed forwardly until the front surface thereof abuts against the wall portion defining the front edge of slot portion 16A. At this time the rear surface of lug 37 is located between the adjacent surfaces of legs 13, 14 while the rear generally vertical edge of cutout 35 is located rearwardly of the rear surface of leg 14. Upon releasing the manual pressure on latch L, the spring 41 pivots the latch in the direction of the arrow 40 to a position that the top surface of the cutout 35 abuts against the vertically adjacent part of leg 14 and/or lug 35 abuts against ledge 32 to limit the movement of the latch in the direction of arrow 40 to a latching position. At this time lug 37 abuts against leg 14 to prevent any substantial withdrawal movement of the mount in the direction of arrow 50 relative the bracket B, the flanges 29 abut against the bracket web to prevent the substantial downward movement of the mount relative to the bracket, and the flanges 28 abut against the lower surface of the web to prevent a substantial upward movement of the mount relative to the bracket. Thus, the mount is securely latched to the bracket. When it is desired to remove the mount from the bracket, manual pressure is exerted on the latch L to pivot it in a direction opposite arrow 40 to a position that the lower edge of lug 37 is above the wall portion defining the bottom edge of slot portion 16B, and thence the mount is withdrawn rearwardly relative to the bracket. Thus, the holder may be quickly securingly latched to the bracket, and quickly removed therefrom without the use of tools.

It is to be understood that the mount may be modified to be integrally formed with the fishing rod. In such event, the parts of the mount defining the fishing rod chamber would be dispensed with and instead the foot portion would be integrally joined to the rod to depend therefrom whereby the part extending downwardly of the fishing rod would include the latch, the latch chamber, recess 39, and lugs 28, 29. In such a case the lower parts of the foot sections would be integrally joined.

With this invention, the reel is located within the boat, and as a result the fishing line can be reeled in without having to detach the mount from the bracket.

What is claimed is:

1. Apparatus for releasably mounting a fishing rod on a wall portion of a boat comprising a mounting bracket mountable on the boat wall portion and a fishing rod mount having a rod mounting portion and a foot portion, said bracket having a foot portion slot and said foot portion having first means extendable into said slot for supporting the holder on the bracket, said bracket and foot portion having cooperating means for releasably locking the mount to the bracket when said first means is extended into said slot, the foot portion cooperating means including a fishing rod mount that is slidably extendable into said slot, a latch having a first end portion and a second end portion, said first end portion having means for latchingly engaging the bracket, means for mounting the latch on the fishing rod mount for pivotal movement between a latching position and a release position, and means for resiliently urging the latch to its latching position, the fishing rod mount having stop means abuttable against the latch for limiting the pivotal movement of the latch from its release position toward the latching position to the latching position, the bracket cooperating means including a bracket wall portion adjacent the slot and the first end portion means comprising latch edge portions defining a latch slot of a size for the last mentioned wall portion to extend into, one of said latch edge portions in the latch latching position being abuttable against said wall portion to lock the mount to the bracket.

2. Apparatus for releasably mounting a fishing rod on a wall portion of a boat comprising a mounting bracket mountable on the boat wall portion and a fishing rod mount having a rod mounting portion and a foot portion, said bracket having a foot portion slot and said foot portion having first means extendable into said slot for supporting the holder on the bracket, said bracket and foot portion having cooperating means for releasably locking the mount to the bracket when said first means is extended into said slot, the foot portion cooperating means including a fishing rod mount that is slidably extendable into said slot, a latch having a first end portion and a second end portion, said first end portion having means for latchingly engaging the bracket, means for mounting the latch on the fishing rod mount for pivotal movement between a latching position and a release position, and means for resiliently urging the latch to its latching position, the fishing rod mount having stop means abuttable against the latch for limiting the pivotal movement of the latch from its release position toward the latching position to the latching position, the mount including parts of the foot portion that define a pair of opposed grooves that are elongated in the general direction of a rod mounted by the rod mounting portion and opening transversely outwardly of one another, and the bracket including bracket portions having spaced facing edges that in part define said slot and are slidably extendable into said grooves, said bracket having a first wall portion, a second wall portion opposite said first wall portion and a top wall portion, said top wall portion having said facing edges, said first wall portion having spaced facing edges that in part define the bracket slot and are substantially further spaced in the same direction than the first mentioned edges, said slot opening outwardly through said first wall portion, said first wall portion having a slot edge that in part defines said slot and opposite first and second surface portions extending downwardly from the slot edge, the second surface portion being intermediate the first surface portion and the second wall portion and forming part of said cooperating means, said first portion means including opposed latch edge portions that in part define a latch cutout, one of the last mentioned edge portions being abuttable against the second surface portion for locking the mount to the bracket when said foot portion is extended into the slot.

3. Fishing apparatus mountable on a boat comprising a mounting bracket adapted to be secured to the boat, and a fishing rod having a mount thereon, said mount including opposite side portions, each side portion having a pair of vertically spaced flanges that in part define an elongated, outwardly opening groove, means defining a latch receiving chamber, an elongated latch having a first end portion extending within said chamber, and means for mounting the latch on the chamber defining means for limited movement between a release position and a latching position, said bracket having a mount receiving slot including spaced flange portions that in part define said slot and are slidably extendable into said grooves, said latch and bracket having cooperating means for locking the mount on the bracket when the bracket flange portions extend into said grooves and the latch is in its latching position, said bracket having a web portion and opposite spaced legs dependingly joined to the web portion, the web portion having said flanged portions, and one of said legs having a slotted portion that defines a part of said slot, is below the web flange portions, and has an opening therethrough of a size for the lower flange of each side portion to slidably move thereinto, the latch cooperating means including a latch portion for latchingly engaging said slotted portion.

4. Fishing apparatus mountable on a boat comprising a mounting bracket adapted to be secured to the boat, and a fishing rod having a mount thereon, said mount including opposite side portions, each side portion having a pair of vertically spaced flanges that in part define an elongated, outwardly opening groove, means defining a latch receiving chamber, an elongated latch having a first end portion extending within said chamber, and means for mounting the latch on the chamber defining means for limited movement between a release position and a latching position, said bracket having a mount receiving slot including spaced flange portions that in part define said slot and are slidably extendable into said grooves, said latch and bracket having cooperating means for locking the mount on the bracket when the bracket flange portions extend into said grooves and the latch is in its latching position, said mount comprising two separable sections that each has one of said portions, and means for releasably clamping said sections together, said sections having wall portions that cooperatively define a rod receiving chamber.

5. The apparatus of claim 4 further characterized in that the mount includes means between the rod chamber wall portions and the rod for providing a clamping fit between the rod and rod chamber wall portions.

* * * * *